United States Patent [19]
Chaumont

[11] 3,712,689
[45] Jan. 23, 1973

[54] TRACK FOR SNOWMOBILE OR THE LIKE

[75] Inventor: Guy-Noel Chaumont, Tring-Jonction, Quebec, Canada

[73] Assignee: Poly-Traction Inc., Tri-Jonction, Quebec, Canada

[22] Filed: March 2, 1971

[21] Appl. No.: 120,157

[52] U.S. Cl. ................................................305/38
[51] Int. Cl. .............................................B62d 55/24
[58] Field of Search........305/35 EB, 37, 38; 180/5 R

[56] References Cited

UNITED STATES PATENTS

| | | | |
|---|---|---|---|
| 3,580,647 | 5/1971 | Richards | 305/35 EB |
| 3,480,339 | 11/1969 | Kell | 305/35 EB |
| 3,623,780 | 11/1971 | Kell | 305/38 |
| 3,582,155 | 6/1971 | Marier | 305/38 |
| 3,612,625 | 10/1971 | Huber | 305/38 |

*Primary Examiner*—Richard J. Johnson
*Attorney*—Cushman, Darby & Cushman

[57] ABSTRACT

The disclosure herein describes an endless flexible track for use on a snowmobile or the like, provided with three longitudinally extending rows of sprocket-teeth-receiving openings disposed in laterally spaced relation in the track. A track so constructed may now be used with various types of sprocket wheel arrangements; such a construction enables an anti-desynchronization effect on the idler sprocket wheels mounted on the rear axle of the snowmobile.

9 Claims, 14 Drawing Figures

INVENTOR
Guy-Noel CHAUMONT

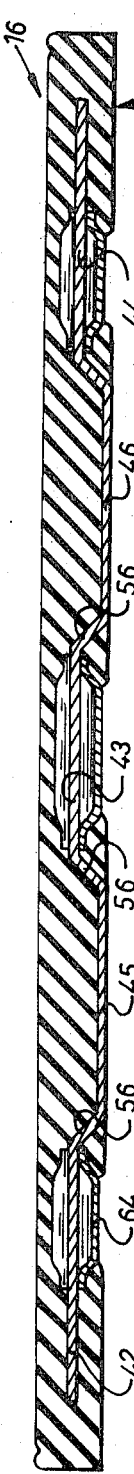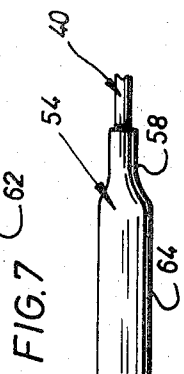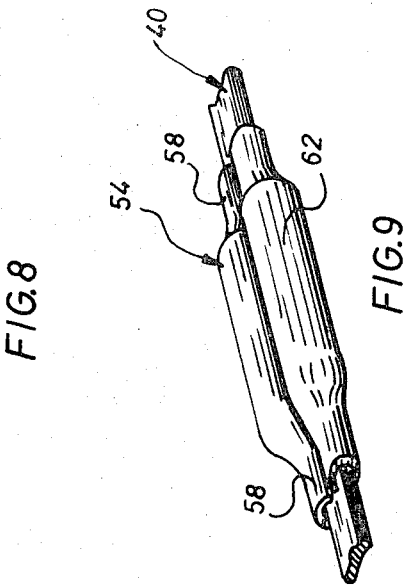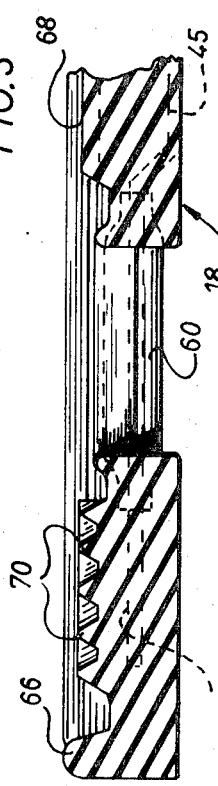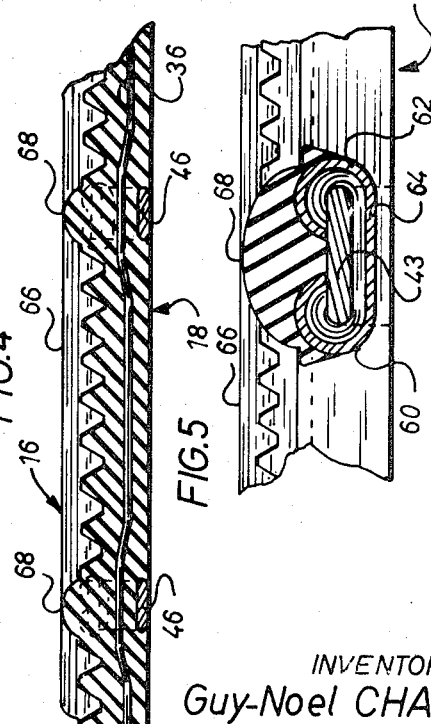

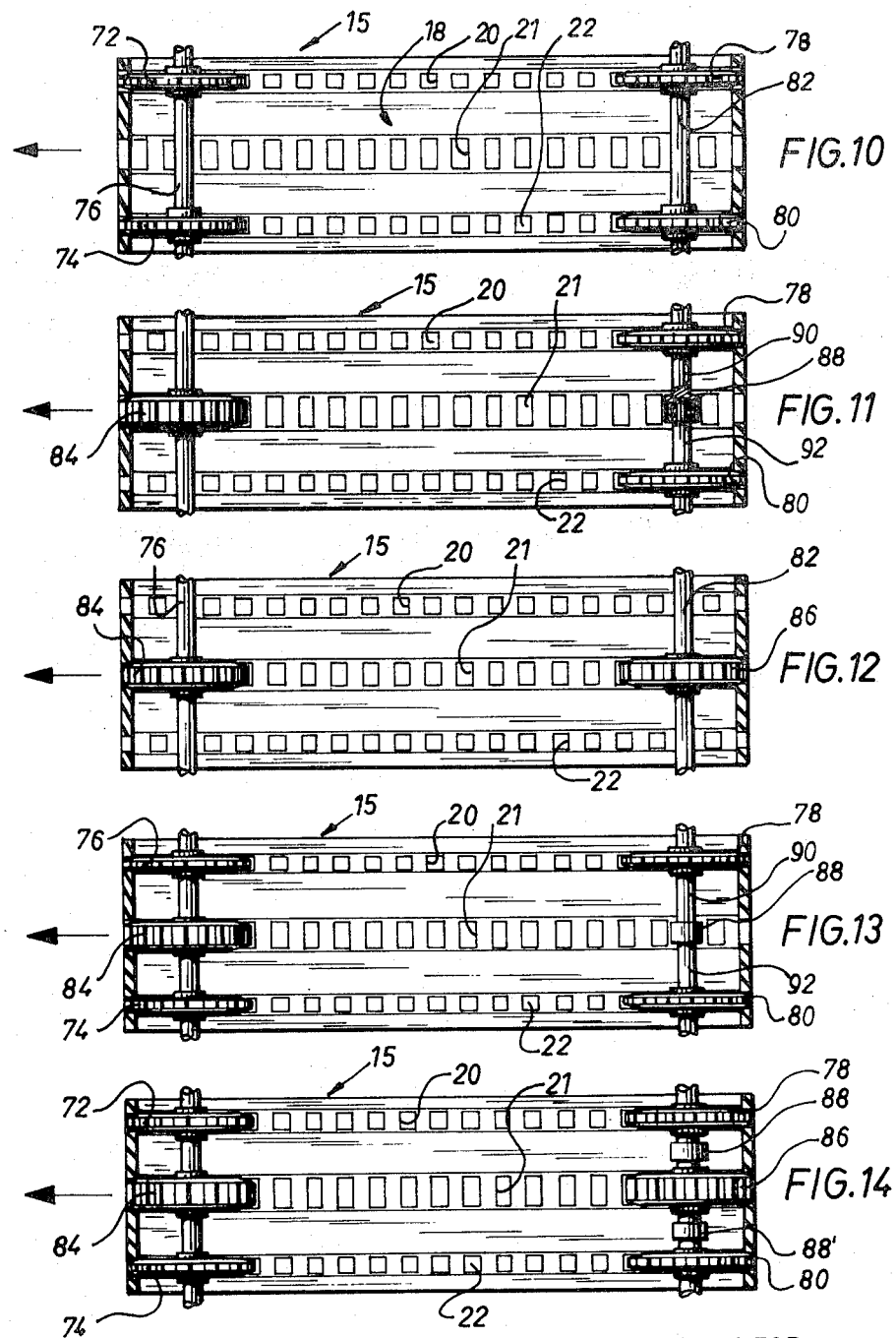

TRACK FOR SNOWMOBILE OR THE LIKE

The present invention relates to tracks for self-propelled vehicles; more particularly, this invention pertains to an improvement in the manufacture of an endless flexible track of the type normally used for driving a snowmobile or the like.

At present, the track used for propelling this type of snow vehicle is commonly made of a thin and elastomeric material having a generally flat inner surface and a corrugated outer surface. The endless track is looped around one or two idler sprocket wheels and one or two drive sprocket wheels, the teeth of the sprockets being received in one or two longitudinal rows of openings extending through the track; the number and size of sprocket wheels on the front drive axle and the number and size of sprocket wheels on the rear idler axle depend upon the intended use and desired performance of the vehicle; for example, some conventional snowmobiles have one front drive sprocket and one rear idler sprocket, in which case the track used consists of one centrally disposed longitudinal row of sprocket-teeth-receiving openings; other snowmobiles may consist of two front drive sprockets and of two rear idler sprockets, in which case the track used will be provided with a pair of laterally spaced longitudinal rows of sprocket-teeth-receiving openings. Furthermore, whether one or two sprockets are used on each axle, the size and the number of the sprocket teeth will be a factor in the final design of the sprocket arrangement; for instance, a track with a single row of openings will be engaged by a sprocket with larger and thus stronger teeth than would a track with two rows of openings for the same amount of torque which is to be transmitted by the front axle of the snowmobile. Therefore, the use of present-day snowmobile tracks is limited to the exact sprocket arrangement existing on a particular snowmobile and track replacement can only be made by a track of similar construction of that of the replaced track.

Another disadvantage of present-day snowmobile tracks is that, since the drive sprocket wheel on the front axle engages the same longitudinal row of openings as does the idler sprocket wheel on the rear axle, there is a desynchronization between front and rear sprocket teeth engaging the openings whenever the elastomeric track is elongated under considerable centrifugal strain. Furthermore, on tracks having two laterally spaced rows of openings, a further desynchronization is added to the aforesaid effect due to transverse strain on the track and to the distortion resulting therefrom. This desynchronization effect greatly reduces the performance of the track because it must overcome greater resistances; furthermore, this effect causes considerable damage to the sprockets.

It is an object of this invention to provide an endless track for snowmobiles or the like which is adapted to be used with various types of sprocket arrangements.

It is also an object of this invention to provide an endless track for snowmobiles or the like, the construction of which enables new types of sprocket arrangements.

It is a further object of this invention to provide an endless flexible track for snowmobiles or the like which enables an anti-desynchronization action when in driving engagement around drive and idler sprocket wheels.

The present invention relates to an endless driving track for use in a snowmobile or the like comprising, in its broadest aspect, an outer ground-engaging surface, an inner surface, a first longitudinally extending row of aligned sprocket-teeth-receiving openings centrally located in the track; and second and third longitudinally extending rows of aligned sprocket-teeth-receiving openings located in the track in laterally spaced relation on either side of the first central row.

By providing an endless track with three rows of sprocket-teeth-receiving openings, tracks presently in use, when defective, may be replaced by a track made in accordance with the present invention without having to alter the sprocket arrangement already present on the snowmobile; the present track will substitute tracks driven by one front sprocket wheel and one rear sprocket wheel as well as tracks driven by a pair of front sprocket wheels and a pair of rear sprocket wheels.

Other objects and advantages will become apparent from the following description of one embodiment of the track with reference to the accompanying drawings wherein:

FIG. 3 is a transverse cross-sectional view taken along lines 3—3 of FIG. 1;

FIG. 4 is a cross-sectional view taken along lines 4—4 of FIG. 1;

FIG. 5 is a fragmentary cross-sectional view taken along lines 5—5 of FIG. 1;

FIG. 6 is a fragmentary cross-sectional view taken along lines 6—6 of FIG. 1;

FIG. 7 is a top plan view of the clip used in the track shown in FIG. 2;

FIG. 8 is a side elevational view of the clip shown in FIG. 7;

FIG. 9 is a perspective view of the clip shown in FIGS. 7 and 8; and

FIGS. 10-14 illustrate different front and rear sprocket wheel arrangements made possible with the present invention.

Figure 1:
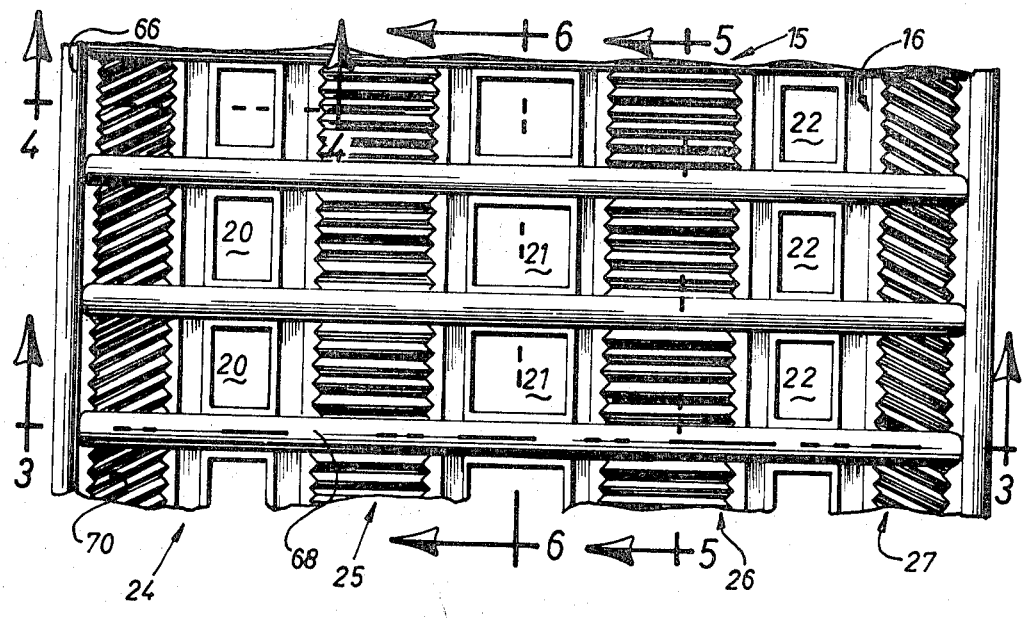
FIG. 1 is a fragmentary plan view of one form of a track constructed in accordance with the present invention.

Referring to FIG. 1 of the drawings, a portion of an endless flexible track embodying the present invention, is shown and is generally denoted by the numeral 15. The track has an outer ground-engaging surface 16 provided with a tread, the configuration of which may adopt various patterns of corrugation. The track has also a generally flat inner peripheral surface 18 (see FIG. 3) to receive the wheels of the snowmobile suspension assembly (not shown). The track 15 illustrated in FIG. 1 has three longitudinally extending rows of aligned sprocket-teeth-receiving openings 20, 21 and 22 that divide the track in four longitudinally extending portions 24, 25, 26 and 27. A first row 21 is centrally located in the track and second and third rows 20 and 22 are located in laterally equidistantly spaced relation on either side of the central row 21. One important feature of the present invention is that the track illustrated in FIG. 1 may be used with presently known types of sprocket arrangement on snowmobiles; it may be used on a snowmobile having one front sprocket wheel and one rear sprocket wheel, in which case only the row of openings 21 would be engaged by both sprockets; it may also be used on a snowmobile having two laterally spaced front sprocket wheels and two laterally spaced rear sprocket wheels, in which case only the rows of openings 20 and 22 would be engaged by the four sprockets. The area of each opening 21 is shown larger than that of each opening 20 or 22 since snowmobiles equipped with only one front and one rear sprocket wheel generally require larger sprocket teeth than that required when a pair of front and rear sprocket wheels are used. In addition to suit presently known sprocket arrangements, the present track enables new sprocket arrangements and an anti-desynchronization between sprockets; these advantages will hereinafter be described with reference to FIGS. 10–14.

Figure 2:
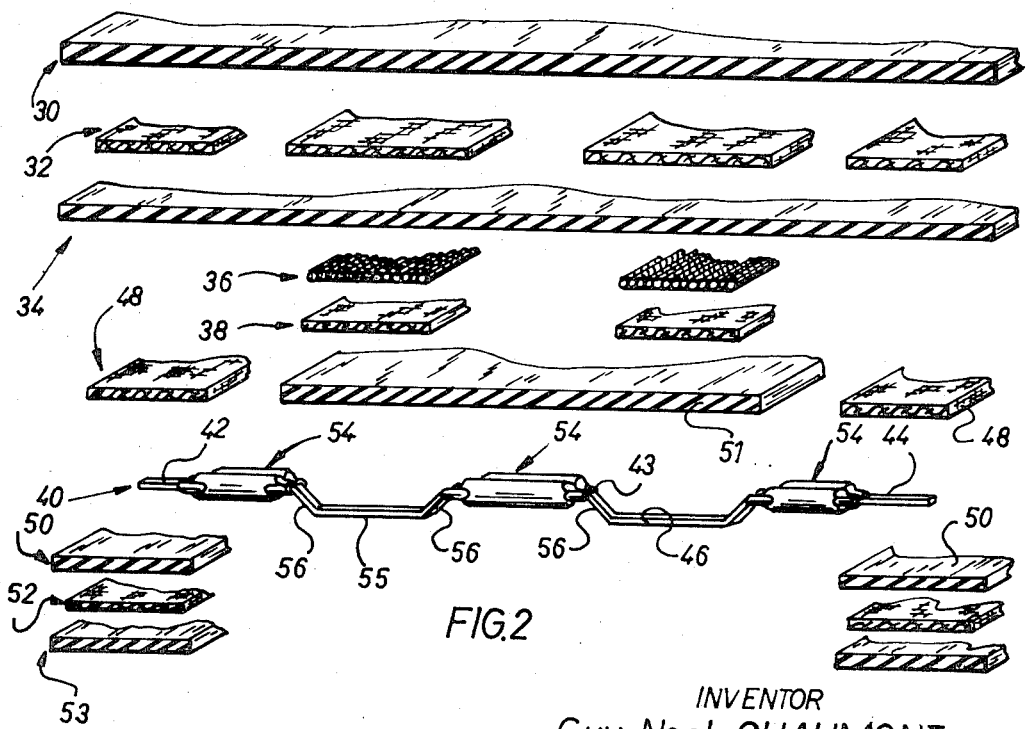
FIG. 2 is an exploded view showing the layup of a track similar to the one shown in FIG. 1.

The present invention may be embodied in all types of track layup. One novel track made possible with the present invention is illustrated in FIGS. 1–9. FIG. 2 shows a typical layup for forming such a track, the detailed specification of each material being known by the person skilled in this art. The outer continuous layer 30 is of rubber followed by a discontinuous layer of woven nylon 32, a second continuous layer of rubber 34, two spaced layers of longitudinally extending steel cables 36 or the like, such as polyester and fiberglass, underneath which are two spaced layers of woven nylon 38. A reinforcing member 40 is incorporated in the track and is transversely disposed thereof. In the present case, the reinforcing member 40 consists of a flat rigid bar of rectangular cross-section with three raised portions 42, 43 and 44 and two remaining lower portions 45 and 46. The end raised portions 42 and 44 are respectively embedded in the track between a layer of nylon 48 and a layer of rubber 50. A layer of rubber 51 extends over the middle raised portion 43 and the two lower portions 45 and 46. The inner surface of the track is finished with a discontinuous layer of nylon 52 and a discontinuous layer of rubber 53. Clips 54 are mounted on the raised portions of the reinforcing member 40 and are located in the longitudinal rows of openings 20, 21 and 22 adjacent the openings. The different layers of rubber and nylon shown in FIG. 2 with the reinforcing member 40, are usually cured under pressure in the moulds of a vulcanizer to form an endless elastomeric track, a cross-section of which is shown in FIG. 3. During the vulcanization, the material will flow underneath such area as inclined portions 56 of the reinforcing member 40 so as to form a continuous generally flat inner surface.

FIGS. 7–9 illustrate one type of clip which can be fixed on the reinforcing member 40. Other types are shown in the inventor's Canadian Pat. No. 833,436 issued Feb. 3, 1970. The clip 54 is made of metal and consists of a tubular member with one longitudinal split; the clip is crimped on the reinforcing member 40 and its opposite ends 58 are further squeezed to take the shape of the reinforcing member 40; in this fashion, the clip cannot rotate about the bar 40. Referring to FIGS. 4 and 6, the metal clip 54 is partially embedded in the elastomeric material where its outside lateral walls 60 and 62 form wear surfaces for the teeth of the sprockets engaging the openings. The undersurface 64 may be recessed relative to the inner surface 18 or in the same plane thereof.

Referring to FIGS. 1 and 5, the outer surface of the track has a tread design consisting of a series of longitudinal ribs 66, transverse ribs 68 and side ribs 70 extending at an angle to the other ribs; this tread and other similar treads provide the track with transverse and longitudinal traction. To provide tensile strength to the track, a plurality of cable-type elements 36 are placed adjacent the central row of openings 21; these elements are made of the inextensible material such as nylon, steel, polyester, fiberglass or other suitable material.

Referring to FIGS. 10–14 of the drawings, there are shown various known and novel sprocket arrangements made possible with a track made in accordance with the present invention, the arrow indicating the forward direction of travel of the snowmobile. Track 15 may be used on a snowmobile provided with two front sprocket wheels 72, 74 journalled on the front drive axle 76 and two rear sprocket wheels 78 and 80 journalled on the rear idler axle 82 (FIG. 10). Track 15 may also be used on a snowmobile provided with one front sprocket wheel 84 journalled on the drive axle 76 and one rear sprocket wheel 86 journalled on the idler axle 82 (FIG. 12). These two types of sprocket arrangements are those generally found on present-day snowmobiles. One important feature of the present invention is that the track made in accordance with the present invention enables sprocket arrangements which have anti-desynchronization effect. As explained above and referring more particularly to FIGS. 10 and 12, because front sprocket wheel 72 and 74 (or drive sprocket wheel 84) engage the same longitudinal row of openings as do the rear sprocket wheels 78 and 80, respectively, (or rear sprocket 86), there is a desynchronization between the sprocket wheels engaging the same row of openings whenever the elastomeric track is elongated under considerable centrifugal strain. There results from this effect a deformation and an excessive wear of the sprocket engaging surfaces. Referring to FIG. 11, because the track is provided with three rows of openings, it is now possible to have a sprocket arrangement consisting of one front sprocket 84 engaging the row of openings 21 and two rear sprockets 78 and 80 engaging respectively the rows of openings 20 and 22. To obviate the desynchronization effect, each rear sprocket 78, 80 is capable of running independently from one another; this is achieved by inserting a decoupling member 88, such as a ball bearing connection or the like which will divide the rear axle into two independently rotating shafts 90 and 92 (FIGS. 11 and 13). The sprocket arrangement illustrated in FIG. 14 shows that two decoupling members 88 and 88' are used so that the three rear sprockets 78, 80 and 86 may rotate independently of one another. In a similar fashion, there may be provided a single fixed rear axle with the respective rear sprocket wheels mounted to rotate freely about the fixed axle. All these sprocket arrangements would be recommended for different usage; for instance, the sprocket arrangement shown in FIG. 11 would be recommended for high speed snowmobiles whereas the sprocket arrangement of FIG. 13 could be mounted on a snowmobile having a high performance engine and the sprocket arrangement of FIG. 14 would be recommended for towing purposes of 24-hour races.

Various other embodiments of the present invention can be apparent to those skilled in the art without departing from the spirit and scope thereof. It is therefore wished to have it understood that this invention is not limited in interpretation except by the terms of the following claims.

What I claim is:

1. An endless driving track for use in a snowmobile or the like comprising an outer ground-engaging surface, an inner generally flat surface, a first longitudinally extending row of aligned sprocket-teeth-receiving openings centrally located in the track, and second and third longitudinally extending rows of aligned sprocket-teeth-receiving openings located in the track in laterally and equidistantly spaced relation on either side of the first central row of openings, the area of the openings of said central row of openings being larger than that of the openings of said second and third rows.

2. An endless driving track as defined in claim 1, further comprising a plurality of equidistantly spaced reinforcing members extending transversely of said track and traversing said first, second and third rows of openings between adjacent openings, each of said reinforcing members having raised portions embedded in said track between said adjacent openings, the remaining portions of said reinforcing member being generally flush with the inner surface of said track.

3. An endless driving track as defined in claim 2, wherein a pair of layers of closely spaced longitudinally extending cable-like elements are incorporated in said track on each side of said central row of aligned openings and above said remaining portions of said reinforcing members.

4. An endless flexible track as defined in claim 3, further comprising three laterally spaced clips secured to each of said reinforcing members, said clips being partially embedded in said track and located in said rows between adjacent openings, sad clips forming front and rear wear surfaces in said openings.

5. An endless flexible track as defined in claim 4, wherein said rows of openings divide said track in four longitudinally extending portions of elastomeric material, said material consisting of first, second and third layers of rubber material and first and second layers of woven nylon interposed between said first, second and third layers or rubber, said layers of rubber and woven nylon extending over said reinforcing member, said elastomeric material further comprising in opposite edge portions of said track, fourth and fifth layers of rubber material separated by a third layer of woven nylon.

6. In a snowmobile or the like having a front drive axle supporting at least one driving sprocket wheel and having a rear idler axle supporting at least one sprocket wheel, an endless driving track looped around said drive sprocket wheel and said idler sprocket wheel comprising an outer ground-engaging surface, an inner generally flat surface, a first longitudinally extending row of aligned sprocket-teeth-receiving openings centrally located in said track, and second and third longitudinally extending rows of aligned sprocket-teeth-receiving openings located in the track in laterally and equidistantly spaced relation on either side of said first central row, the area of each opening of said central row being larger than that of the openings of said second and third rows, the teeth of the sprocket wheel engaging the openings of said central row being substantially bigger than the teeth of said sprocket wheels engaging the second and third rows of openings.

7. In a snowmobile as defined in claim 6, wherein said front drive axle supports one sprocket wheel for rotation therewith, the teeth of said sprocket wheel engaging the central row of openings; wherein the rear idler axle supports a pair of sprocket wheels, the teeth of which engage the second and third rows of openings, respectively; and further comprising means on said rear axle for causing said rear sprocket wheels to rotate independently from one another thereby providing an anti-desynchronization effect therebetween.

8. In a snowmobile as defined in claim 7, wherein said front drive axle further supports for rotation therewith a pair of sprocket wheels, the teeth of which respectively engage the second and third rows of openings.

9. In a snowmobile as defined in claim 8, wherein said rear axle further includes a third sprocket wheel engaging the central row of openings and means for causing said third sprocket wheel to rotate on said rear axle independently of said other sprocket wheels mounted on said rear axle.

* * * * *